US012209912B2

(12) United States Patent
Tomlin et al.

(10) Patent No.: US 12,209,912 B2
(45) Date of Patent: Jan. 28, 2025

(54) OPTICAL READOUT FOR THERMAL DETECTOR ARRAY

(71) Applicant: Government of the United States of America, as represented by the Secretary of Commerce, Gaithersburg, MD (US)

(72) Inventors: Nathan Andrew Tomlin, Boulder, CO (US); Christopher Shing-Yu Yung, Louisville, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 440 days.

(21) Appl. No.: 17/747,443

(22) Filed: May 18, 2022

(65) Prior Publication Data
US 2023/0375413 A1 Nov. 23, 2023

(51) Int. Cl.
| | | |
|---|---|---|
| *G01J 5/20* | (2006.01) | |
| *G01J 5/08* | (2022.01) | |
| *G01J 5/0818* | (2022.01) | |
| *G02B 6/42* | (2006.01) | |

(52) U.S. Cl.
CPC .............. *G01J 5/20* (2013.01); *G01J 5/0818* (2013.01); *G01J 5/0853* (2013.01); *G01J 5/0896* (2013.01); *G02B 6/4215* (2013.01); *G01J 2005/202* (2013.01)

(58) Field of Classification Search
CPC .......... G01J 5/08; G01J 5/0818; G01J 5/0821; G01J 5/0853; G01J 5/0896; G01J 5/20; G01J 5/58; G01J 2005/202; G01J 2005/103; G01J 2005/106; G02B 6/4215
See application file for complete search history.

(56) References Cited

U.S. PATENT DOCUMENTS

| | | | |
|---|---|---|---|
| 7,068,865 B2 | 6/2006 | Hamann et al. | |
| 7,820,970 B1 * | 10/2010 | Shaw | G01J 5/44 |
| | | | 250/338.1 |
| 7,872,233 B2 | 1/2011 | Hu et al. | |
| 9,476,774 B2 * | 10/2016 | Oulachgar | G01J 3/42 |
| 10,151,638 B2 * | 12/2018 | Tao | G01J 5/20 |
| 10,559,704 B2 * | 2/2020 | Meyer | G02B 6/124 |
| 11,381,761 B2 * | 7/2022 | Carr | H10N 10/10 |
| 2023/0032022 A1 * | 2/2023 | Klimov | G01J 5/20 |

* cited by examiner

*Primary Examiner* — Gordon J Stock, Jr.
(74) *Attorney, Agent, or Firm* — Office of Chief Counsel for National Institute of Standards and Technology

(57) ABSTRACT

Embodiments of the present invention relate to an optical detector system capable of detecting in the infrared and terahertz regions of the electromagnetic spectrum with increased sensitivity and simplicity. It includes microbolometers in an array, a waveguide for receiving readout light input from an optical light source, waveguide splitters for splitting the waveguide to output waveguides such that each microbolometer in the array is optically coupled to an output waveguide. The output waveguide is coupled to an optical resonator of the microbolometer at a resonance frequency to generate a readout light output having a characteristic based on a change in a characteristic of the optical resonator. The system further includes a detector for receiving the readout light output from each of the output waveguides to convert the readout light output to an electrical signal.

20 Claims, 4 Drawing Sheets

(A)

(B)

(C)

OPTICAL READOUT FOR THERMAL DETECTOR ARRAY

STATEMENT REGARDING FEDERAL RIGHTS

The invention described herein was made with United States Government support from the National Institute of Standards and Technology (NIST), an agency of the United States Department of Commerce. The United States Government has certain rights in the invention.

FIELD OF THE INVENTION

The present invention relates generally to optical readout of thermal detectors, and more particularly, to an optical readout of a thermal detector array system with photonic readout used to detect infrared (IR) (including near-, mid-, and far-IR) and terahertz radiation.

BACKGROUND OF THE INVENTION

There are two broad classes of optical detectors used to detect the characteristics of an optical signal and they include photon detectors and thermal detectors. These optical detectors often include materials that can generate a voltage, a change in electrical resistance, or eject electrons when incident radiation is absorbed by the material. A photon detector generates free electrons when the incident radiation excites electrons from the valence band to the conduction band of the detector material. The quantum of light must have sufficient energy to free an electron. The response of such type of detector depends on wavelength or frequency of the incident radiation.

In a thermal detector, incident radiation is absorbed by a detector material (absorber) and converted to heat, resulting in an increase in temperature. One of the commonly used thermal detectors is a bolometer, which requires thermal isolation, an absorber, and a thermometer. The absorber absorbs incident radiation and thereby changes the temperature of the bolometer. Typical bolometers use resistive thermometers (thermistors), which change electrical resistance with temperature. The intensity of the incident radiation is detected as an electric signal based on the change in electrical resistance. The bolometer temperature changes in proportion to the amount of incident radiant flux (W/m$^2$) and the resistance change is measured by biasing the bolometer with a voltage (or current) and measuring the current (or voltage) through it.

The sensitivity of a bolometer is, in part, determined by the thermal isolation to the surrounding environment (thermal conductance), usually provided by a thin-film membrane. The thermal conductance of a bolometer is often limited by the membrane isolation legs and the thin film wiring on the isolation legs. The sensitivity is increased (thermal conductance decreased) by having fewer, narrower, thinner, and longer isolation legs and wires. The wiring often contributes to thermal conductance due to the thermal conductivity of the wiring material itself, and the lead resistance can be kept manageable by limiting the length and width of the membrane isolation legs. By using optical readout of a bolometer instead of resistive readout, the wires are not needed, which decreases the thermal conductance, leading to potentially higher sensitivity.

A microbolometer array is typically a one-dimensional or two-dimensional array of bolometers utilized for detecting infrared radiation and generating infrared images. A single bolometer constitutes an element of the array. Each bolometer element in the microbolometer array is approximately five micrometers to hundreds of micrometers in lateral size. Two dimensional microbolometer arrays can detect variations in the amount of radiation emitted from objects within its field of view and can form two-dimensional images therefrom. Linear microbolometers arrays (one dimensional) may similarly be formed to obtain line images. The resistance variation of each element is proportional to the received radiant flux (W/m$^2$). A circuit measuring the resistance variation of the bolometer element is the readout integrated circuit (ROIC). The ROIC utilizes time-multiplexing to read the resistance of each bolometer element in the array and transmits the resistance of each element to an image digital signal processor for imaging. ROICs necessitate the use of metallic wires to electrically read out each element thereby increasing the thermal conductance of the element and, subsequently, decreasing the detector sensitivity. The thermal conductance of a bolometer is often dominated by the thermal conductance of the wire as the supporting structure consists of a low thermal conductivity dielectric such as silicon nitride. A microbolometer without wires would increase thermal isolation compared to that of a microbolometer array readout with a ROIC.

Waveguide-coupled photonic resonators can be used as an alternate means for measuring temperature changes in each of the bolometer element in the microbolometer array. Waveguide-coupled photonic resonators evanescently couple to a specific frequency of light. The resonance of the resonator is sensitively dependent upon factors such as physical size of the resonator and the index of refraction of the medium composing the resonator. Both the resonator size and index of refraction are temperature dependent. The resonator size temperature dependence is determined from the coefficient of thermal expansion of the material. The index of refraction temperature dependence is governed by the thermo-optic coefficient of the material.

Photonic resonators act as sensitive thermometers. Coupling photonic resonators to waveguides allows them to optically readout temperature changes in each of the bolometer element using visible to IR light. As the temperature of the photonic resonator changes, the resonant frequency of the photonic resonator changes. Shifts in the resonant frequency are exhibited in the spectral light exiting the waveguide. Optically detecting the shift in the resonant frequency of the light coupled to the photonic resonator is a measure of the local temperature change of the photonic resonator. Peak detection and the resulting frequency shift of the coupled light may require custom readout electronics and signal processing to detect the temperature change of each bolometer element in a microbolometer array.

Accordingly, there is a need for an improved readout of a thermal detector array capable of operating in the Terahertz and IR regions of the electromagnetic spectrum. There is also a need for a readout of a thermal detector array including for readout mechanism, without the use of electric wires or ROIC and having higher sensitivity.

SUMMARY OF THE INVENTION

Embodiments of the present invention relate to an optical readout of a thermal detector array capable of operating in the IR and terahertz regions of the electromagnetic spectrum. Embodiments of the present invention relate to an optical readout of a thermal detector array having higher sensitivity compared to thermal detector arrays with electrical readout.

An embodiment of the present invention relates to an optical detector system including an optical light source for providing a readout light input having a predetermined frequency; a plurality of microbolometers positioned in an array, wherein each of the plurality of the microbolometers comprises a substrate comprising a trench positioned along the center of the substrate, wherein the trench has a depth equal to about a thickness of the substrate; a membrane layer positioned on the first substrate, wherein the membrane layer comprises a membrane and a plurality of membrane isolation legs, wherein the plurality of the membrane isolation legs and the membrane form a first platform suspended in the trench formed by the substrate, wherein the plurality of the membrane isolation legs provide thermal isolation to the membrane; an absorber positioned on the membrane to absorb heat from electromagnetic radiation incident on the absorber; an optical resonator positioned in thermal connection with the absorber, wherein the optical resonator couples a portion of the readout light input at a resonance frequency; a waveguide for receiving the readout light input from the optical light source; a plurality of waveguide splitters for splitting the waveguide to a plurality of output waveguides, wherein each of the plurality of the microbolometers is optically coupled to at least one of the plurality of the output waveguides, wherein the at least one of the plurality of the output waveguides coupled to the microbolometer is configured to couple the portion of the readout light input to the optical resonator at the resonance frequency to generate a readout light output, wherein the readout light output having a change in a characteristic from the readout light input based on a change in a characteristic of the optical resonator; and a detector for receiving the readout light output from each of the plurality of the output waveguides, wherein the detector is configured to convert the readout light output received from each of the plurality of the output waveguides to an electrical signal corresponding to the change from the readout light input and determine a temperature based on the electrical signal corresponding to the readout light output. More particularly, the substrate comprises a silicon layer, the first and the second dielectric layers comprises silicon dioxide, the membrane layer comprises silicon nitride, and the optical resonator and the waveguide comprises silicon nitride.

In one embodiment of the present invention, the plurality of the microbolometers is positioned in a one-dimensional array. In another embodiment of the present invention, the plurality of the microbolometers is positioned in a two-dimensional array.

Embodiments in accordance with the present invention can further include a first dielectric layer positioned on the substrate, wherein the first dielectric layer forms an etch stop below the membrane layer; and a second dielectric layer positioned on the membrane layer, wherein the second dielectric layer is positioned below the optical resonator and the at least one of the plurality of the output waveguides, wherein the second dielectric layer separates the membrane layer from the optical resonator and the at least one of the plurality of the output waveguides.

In some embodiments of the present invention, the absorber positioned on the membrane absorbs heat from infrared radiation incident on the absorber. In other embodiments of the present invention, the absorber positioned on the membrane absorbs heat from terahertz radiation incident on the absorber.

In an exemplary embodiment of the present invention, the optical resonator is configured to change the resonant frequency upon a temperature change. In another exemplary embodiment of the present invention, the change in the characteristic of the optical resonator comprises a change in refractive index of the optical resonator.

Another embodiment of the present invention relates to an optical detector system including an optical light source for providing a readout light input having a predetermined frequency; a plurality of microbolometers positioned in an array, wherein each of the plurality of the microbolometers comprises a substrate comprising a trench positioned along the center of the substrate, wherein the trench has a depth equal to about a thickness of the substrate; a first dielectric layer positioned on the substrate to form an etch stop; a membrane layer positioned on the first dielectric layer, wherein the membrane layer comprises a membrane and a plurality of membrane isolation legs, wherein the plurality of the membrane isolation legs and the membrane form a first platform suspended in the trench formed by the substrate, wherein the plurality of the membrane isolation legs provide thermal isolation to the membrane; a second dielectric layer positioned on the membrane layer; an optical resonator positioned on the second dielectric layer, wherein the second dielectric layer separates the optical resonator from the membrane layer, wherein the optical resonator couples a portion of the readout light input at a resonance frequency; an absorber positioned on the membrane and in thermal connection with the optical resonator, wherein the absorber absorbs heat from electromagnetic radiation incident on the absorber; a waveguide for receiving the readout light input from the optical light source; a plurality of waveguide splitters for splitting the waveguide to a plurality of output waveguides, wherein each of the plurality of the microbolometers is optically coupled to at least one of the plurality of the output waveguides, wherein the at least one of the plurality of the output waveguides coupled to the microbolometer is positioned on the second dielectric layer, wherein the second dielectric layer separates the at least one of the plurality of the output waveguides from the membrane layer, wherein the at least one of the plurality of the output waveguides coupled to the microbolometer is configured to couple the portion of the readout light input to the optical resonator at the resonance frequency to generate a readout light output, wherein the readout light output having a change in a characteristic from the readout light input based on a change in a characteristic of the optical resonator; and a detector for receiving the readout light output from each of the plurality of the output waveguides, wherein the detector is configured to convert the readout light output received from each of the plurality of the output waveguides to an electrical signal corresponding to the change from the readout light input and determine a temperature based on the electrical signal corresponding to the readout light output. More particularly, the substrate comprises a silicon layer, wherein the first and the second dielectric layers comprises silicon dioxide, wherein the membrane layer comprises silicon nitride, and wherein the optical resonator and the waveguide comprises silicon nitride.

In embodiments in accordance with the present invention, the optical resonator is selected from a group comprising a ring resonator, a disk resonator, a toroid resonator, a photonic crystal cavity, a whispering gallery mode resonator, a Bragg grating, and a Fabry-Perot interferometer.

Embodiments of the present invention also relate to an optical detector system including an optical light source for providing a readout light input having a predetermined frequency; a plurality of microbolometers positioned in an array, wherein each of the plurality of the microbolometers comprises: a substrate comprising a trench positioned along the center of the substrate, wherein the trench has a depth equal to about a thickness of the substrate; a first silicon dioxide layer positioned on the substrate to form an etch stop; a silicon nitride layer positioned on the first dielectric layer, wherein the silicon nitride layer comprises a membrane and a plurality of membrane isolation legs, wherein the plurality of the membrane isolation legs and the membrane form a first platform suspended in the trench formed by the substrate, wherein the plurality of the membrane isolation legs provide thermal isolation to the membrane; a second silicon dioxide layer positioned on the silicon nitride layer; an optical resonator positioned on the second silicon dioxide layer, wherein the second silicon dioxide layer separates the optical resonator from the membrane layer, wherein the optical resonator couples a portion of the readout light input at a resonance frequency, wherein the optical resonator is configured to change the resonant frequency upon a temperature change; an absorber positioned on the membrane and in thermal connection with the optical resonator, wherein the absorber absorbs heat from electromagnetic radiation incident on the absorber; a waveguide for receiving the readout light input from the optical light source; a plurality of waveguide splitters for splitting the waveguide to a plurality of output waveguides, wherein each of the plurality of the microbolometers is optically coupled to at least one of the plurality of the output waveguides, wherein the at least one of the plurality of the output waveguides coupled to the microbolometer is positioned on the second silicon dioxide layer, wherein the second silicon dioxide layer separates the at least one of the plurality of the output waveguides from the membrane layer, wherein the at least one of the plurality of the output waveguides coupled to the microbolometer is configured to couple the portion of the readout light input to the optical resonator at the resonance frequency to generate a readout light output, wherein the readout light output having a change in a characteristic from the readout light input based on a change in the resonant frequency of the optical resonator; and a detector for receiving the readout light output from each of the plurality of the output waveguides, wherein the detector is configured to convert the readout light output received from each of the plurality of the output waveguides to an electrical signal corresponding to the change from the readout light input and determine a temperature based on the electrical signal corresponding to the readout light output.

In embodiments in accordance with the present invention, the optical resonator is selected from a group comprising a ring resonator, a disk resonator, a toroid resonator, a photonic crystal cavity, a whispering gallery mode resonator, a Bragg grating, and a Fabry-Perot interferometer.

DETAILED DESCRIPTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention. Reference will now be made to the drawings wherein like numerals refer to like elements throughout.

Figure 1:
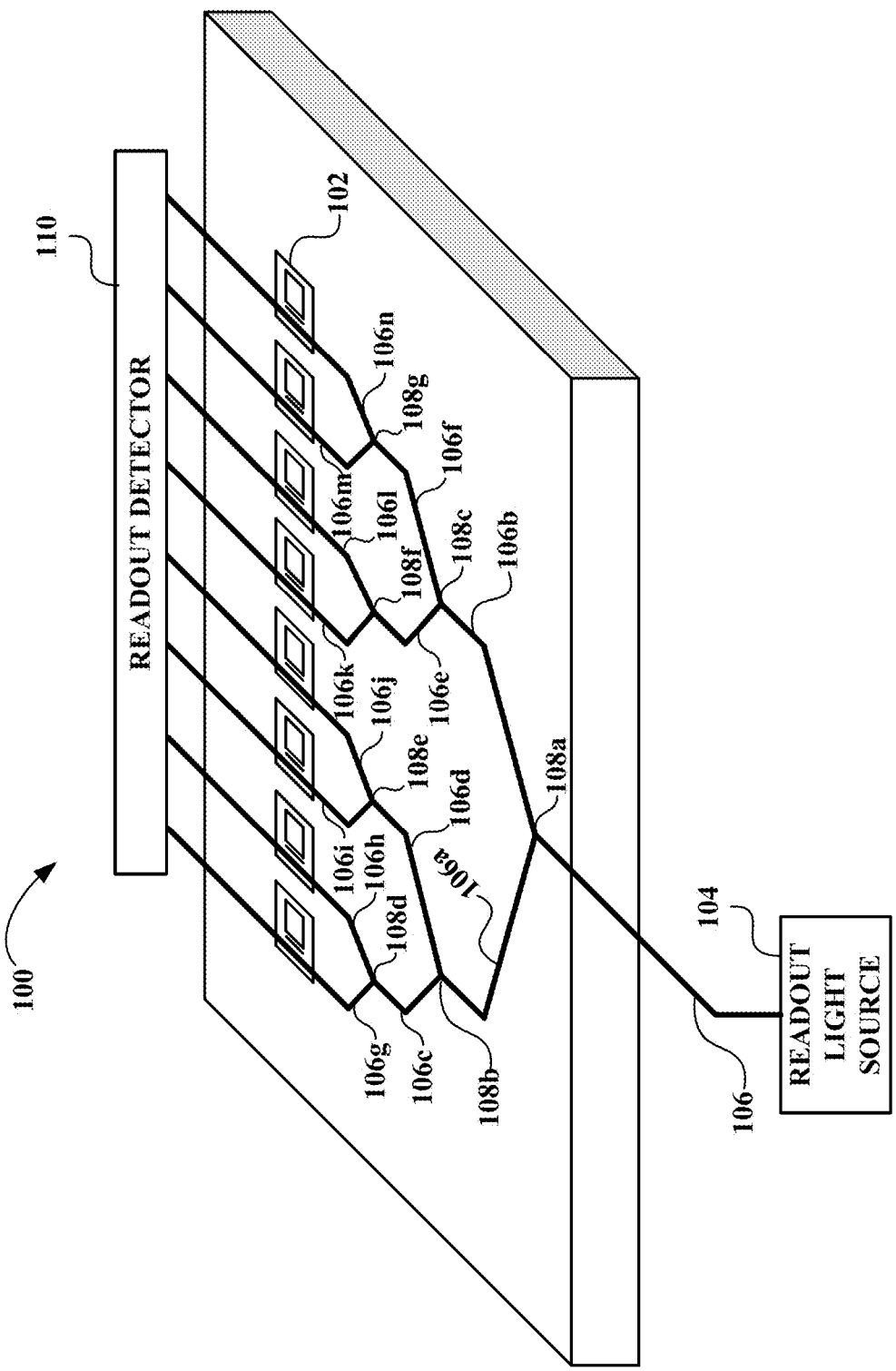
FIG. 1 illustrates an optical detector system in accordance with an embodiment of the present invention.
Figure 2:
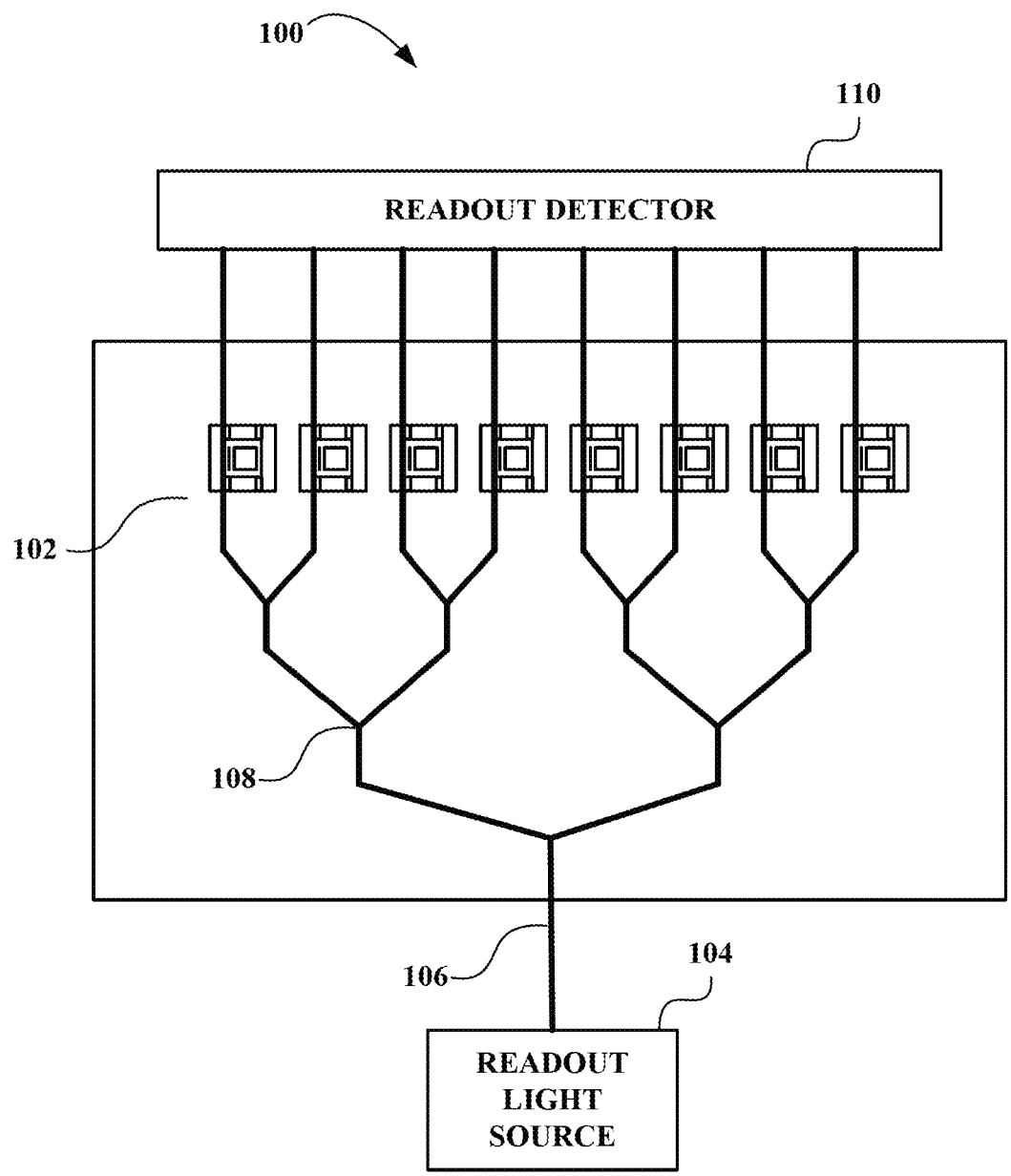
FIG. 2 illustrates an alternate perspective of an optical detector system in accordance with an embodiment of the present invention.

Referring now to the drawings, and more particularly, to FIGS. 1 and 2, there is shown an optical detector system, generally designated 100, which comprises embodiments of the present invention. According to various embodiments, optical detector system 100 includes a microbolometer array 102, a readout light source 104, a waveguide 106, waveguide splitters 108, and a readout detector 110.

Figure 3:
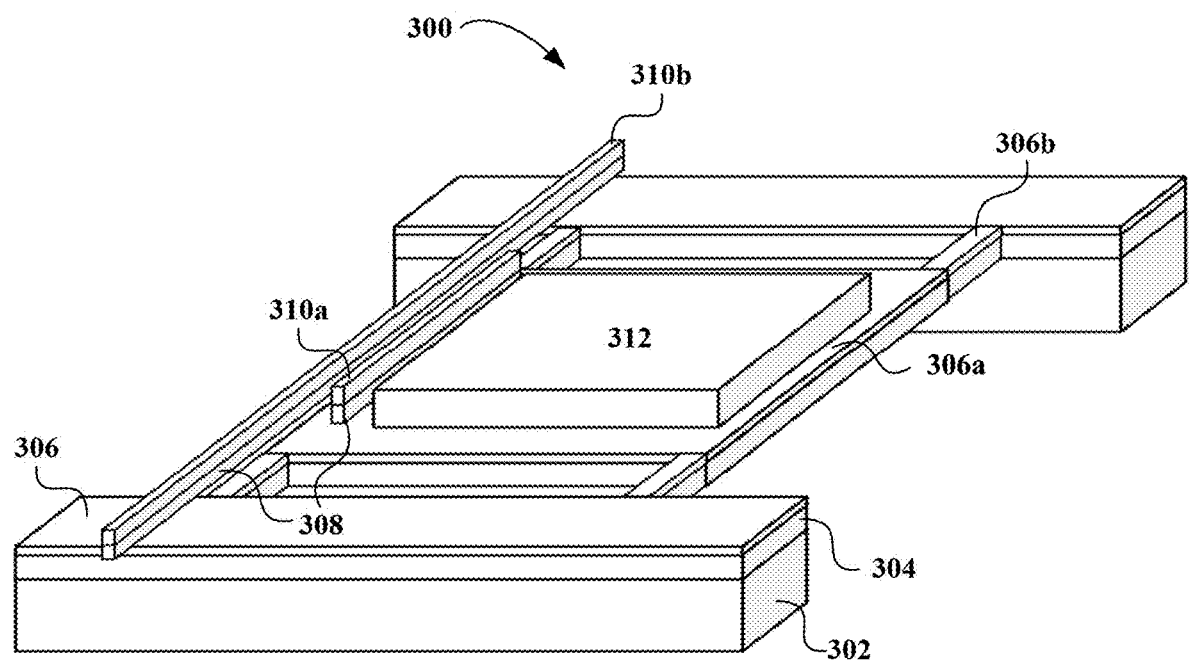
FIG. 3 is a schematic diagram of a single bolometer element in accordance with an embodiment of the present invention.
Figure 4:
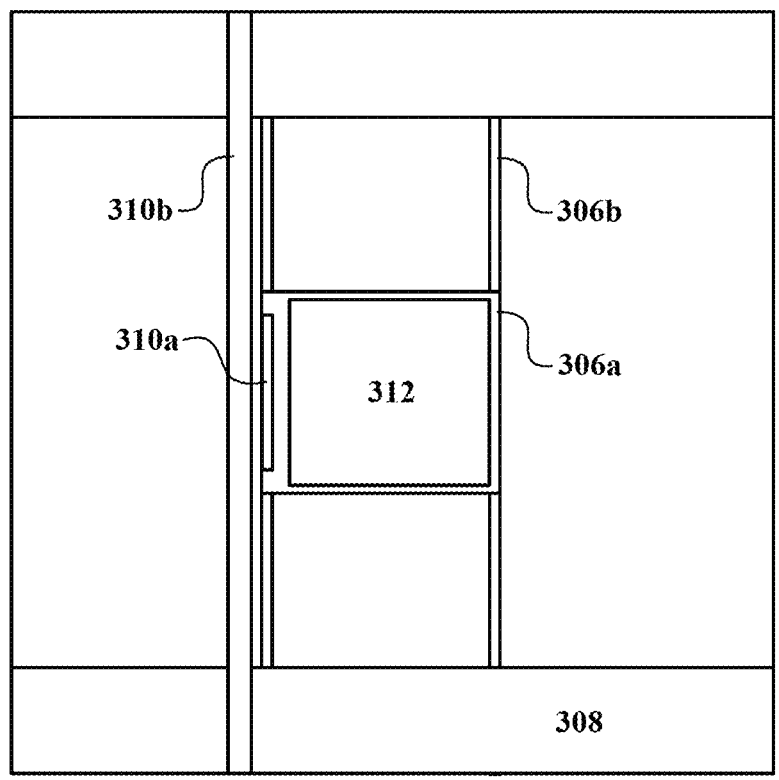
FIG. 4 illustrates (A) top view, (B) first side view and (C) second side view of the single bolometer element shown in FIG. 3.
Figure 4:
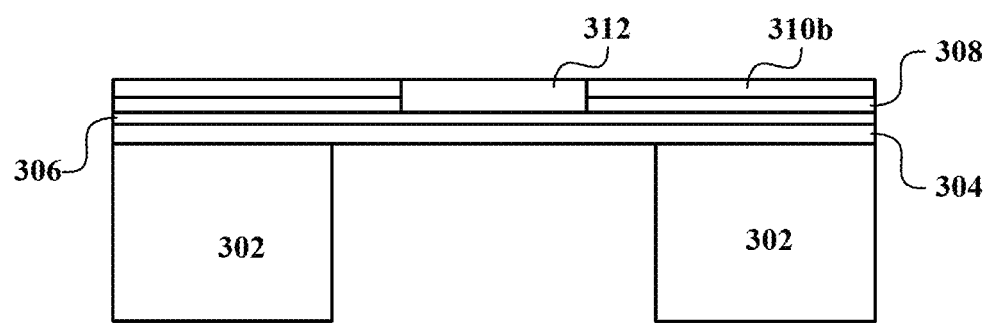
Figure 4:
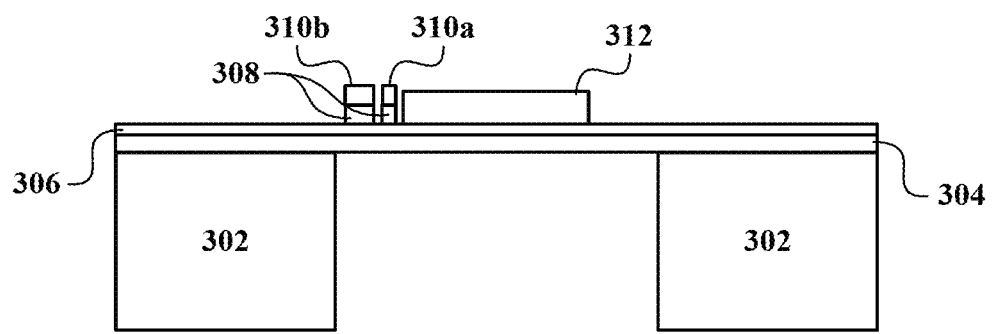

Microbolometer array 102 can be a one or two-dimensional array of single bolometer elements. Referring now to FIGS. 3 and 4, there is shown an embodiment of a single bolometer element, generally designated as 300, in microbolometer array 102. Bolometer element 300 is formed on a substrate 302. Exemplary materials that can be used to form substrate 302 include silicon, silicon dioxide, a silicate (e.g., borosilicate glass, lead glass, aluminum silicate), carbonate (e.g., sodium carbonate), glass-ceramics, amorphous metal, or silica-free glasses, and the like. Substrate 302 may be formed of other suitable materials based on a desired application or properties of the single bolometer element 300.

In some embodiments of the present invention, a trench is positioned along the center of substrate 302 having a depth equal to about the thickness of substrate 302. Multiple layers of materials may be formed on top of substrate 302, with each layer having a predetermined thickness. In one embodiment of the present invention, a first dielectric layer 304 is formed on top of substrate 302, a membrane layer 306 is formed on top of first dielectric layer 304, a second dielectric layer 308 is formed on top of membrane layer 306, and a waveguide layer 310 is formed on top of second dielectric layer 308, as shown in FIG. 3. In another embodiment of the present invention, membrane layer 306 is formed on top of substrate 302 and waveguide layer 310 is formed on top of membrane layer 306. In an exemplary embodiment of the present invention, substrate 302 is formed from silicon, first dielectric layer 304 is formed from silicon dioxide, membrane layer 306 is formed from silicon nitride, second dielectric layer 308 is formed from silicon dioxide, and waveguide layer 310 is formed from silicon or silicon nitride.

Portions of membrane layer 306 are selectively removed to form a microbolometer membrane 306a and membrane isolation legs 306b in the trench formed by substrate 302, as shown in FIGS. 3 and 4. Portions of first dielectric layer 304 are also selectively removed such that first dielectric layer 304 forms an etch stop below microbolometer membrane 306a and membrane isolation leas 306b. Microbolometer membrane 306a is suspended in the trench formed by substrate 302 by membrane isolation legs 306b to provide a weak thermal link and thermal isolation, as shown in FIGS. 3 and 4. Proximal end of each of membrane isolation legs 306b is coupled to one side of membrane 306a and a terminal end of each of membrane isolation legs 306b is coupled to membrane layer 306 such that membrane 306a and membrane isolation legs 306b form a platform suspended in the trench formed by substrate 302, as shown in FIG. 3. In some embodiments of the present invention, membrane layer 306, membrane 306a, and each of thermal isolation membrane isolation legs 306b are formed from silicon nitride.

Bolometer element 300 includes an absorber layer 312 positioned on microbolometer membrane 306a and in thermal contact with optical resonator 310a. Absorber layer 312 can be made from material suitable for measuring radiation of interest, including radiation in IR and terahertz regions of the electromagnetic spectrum. Exemplary material that can be used for absorber layer 312 include carbon nanotubes, thin-film stack, metallic layer, and the like. In one embodiment of the present invention, absorber layer 312 is vertically aligned carbon nanotubes.

Referring back to FIGS. 3 and 4, an optical resonator 310a is positioned on membrane 306a and adjacent to absorber layer 312 such that a change in absorption of radiation in absorber layer 312 causes a change in the temperature of membrane 306a and optical resonator 310a. Optical resonator 310a can be a ring resonator, a disk resonator, a toroid resonator, a photonic crystal cavity, a whispering gallery mode resonator, a Bragg grating, a Fabry-Perot interferometer (e.g., etalons), or any other appropriate optical resonator. Optical resonator 310a is formed by selectively removing portions of waveguide layer 310 to form optical resonator 310a, as shown in FIGS. 3 and 4.

A waveguide 310b is positioned parallel to and proximate to optical resonator 310a such that waveguide 310b is optically coupled to optical resonator 310a. Waveguide 310b is formed by selectively removing portions of waveguide layer 310 to form waveguide 310b, as shown in FIGS. 3 and 4. In one embodiment of the present invention, portions of second dielectric layer 308 are also selectively removed such that second dielectric layer 308 forms a shape substantially similar to optical resonator 310a and waveguide 310b and positioned below optical resonator 310a and waveguide 310b, as further shown in FIGS. 3 and 4. Second dielectric layer 308 separates membrane layer 306 from optical resonator 310a and waveguide 310b.

Waveguide 310b is a conduit that is configured to propagate a readout light input such that at least a portion of the readout light input that enters waveguide 310b is received into optical resonator 310a. Waveguide 310b is coupled to optical resonator 310a via a coupling region, which is a region of waveguide 310b positioned at minimum distance from optical resonator 310a. Optical resonator 310a is tuned to an optical wavelength that matches the readout light input propagating in waveguide 310b. Readout light input propagating in waveguide 310b evanescently couples to optical resonator 310a in the coupling region. Amount of coupling depends on the gap spacing between waveguide 310b and optical resonator 310a, matching between propagation constant of propagating mode through waveguide 310b and resonating mode inside optical resonator 310a, and the geometry and index of refraction of optical resonator 310a. A portion of the coupled light is absorbed by optical resonator 310a at resonant wavelengths of optical resonator 310a. The remaining light passes through coupling region via waveguide 310b and reaches an exit port. In one embodiment of the present invention, waveguide 310b is separated from the edge of optical resonator 310a by a gap of about 10 nm to about 500 nm. In one embodiment of the present invention, the optical resonator 310a is a photonic crystal microcavity.

Bolometer element 300 can be used to measure temperature based on a resonant frequency of optical resonator 310a that changes due to thermo-optic effects of optical resonator 310a. The thermo-optic effect can be due to a change in the refractive index as a function of temperature of the material forming optical resonator 310a corresponding to a change in temperature of bolometer element 300. The thermo-optic effect can also be due to a change in the geometrical lengths due to the coefficient of linear thermal expansion of the material forming optical resonator 310a corresponding to a change in temperature of bolometer element 300. A change in the refractive index or length of the material forming optical resonator 310a causes a change in the resonant frequency, thereby changing the amplitude of light in the resonantly coupled waveguide 310b. A change in the coupling between waveguide 310b and resonator 310a changes the transmission of light exiting from waveguide 310b as readout light output.

Referring back to FIGS. 1 and 2, optical detector system 100 includes a readout light source 104 that generates a readout light. Readout light source 104 may be a tunable light source that is controllable to adjust frequency of the light. In some embodiments, readout light source 104 is a laser light source that generates laser light. In exemplary embodiments of the present invention, readout light source 104 can generate visible spectrum light, near-infrared light, mid-infrared light, and ultra-violet spectrum light. Readout light source 104 may be a continuous-wave narrow band laser light source, a frequency comb light source, a broadband light source, a pulsed light source, a coherent light source, an incoherent light source, or any other type of light source that is operable to produce light compatible with optical resonance in each bolometer element 300 of microbolometer array 102. In one embodiment of the present invention, the readout light input comprises a frequency of about 300 nm to about 2000 nm.

Waveguide 106 is coupled to readout light source 104 to receive readout light generated by readout light source 104. Waveguide 106 is a conduit to propagate the readout light received from readout light source 104 to each of bolometer element 300 of microbolometer array 102 in optical detector system 100 and propagate readout light out of each of bolometer element 300 after detection of electromagnetic radiation incident on bolometer element 300. In one embodiment of the present invention, waveguide 106 can propagate a single or narrow laser frequency. Waveguide 106 may be formed of a material having optically transparent properties such that at least a portion of the readout light entering waveguide 106 is propagated therethrough via internal reflection in waveguide 106. The readout light entering waveguide 106 from readout light source 104 is directed to waveguide splitters 108a-g, which splits the readout light for further transmission through waveguides 106a-n to each of bolometer element 300 of microbolometer array 102 in optical detector system 100. In one embodiment of the present invention, each of waveguide splitters 108a-g is a beam splitter that splits the beam into two beams of readout light having the same optical characteristics.

Readout light output exiting from each of bolometer element 300 of microbolometer array 102 is propagated through waveguides 106g-n to readout detector 110. In one embodiment of the present invention, readout detector 110 is positioned adjacent to each of bolometer element 300 of microbolometer array 102. In another embodiment of the present invention, readout detector 110 is spatially separated from each of bolometer element 300 of microbolometer array 102. Readout detector 110 is coupled to each of waveguides 106g-n to receive readout light output and convert the readout light output received from each of waveguides 106g-n to a signal corresponding to the modified property of the readout light output. In one embodiment of the present invention, readout detector 110 is configured to convert the readout light output received from each of waveguides 106g-n to an electrical signal corresponding to the modified property of the readout light output and determine a temperature based on the electric signal detected. In one embodiment of the present invention, a calibrated black body of known temperature is used to correlate the temperature of the bolometer element to the detected electrical signal. A scene of a known temperature with emissivity equal to about 1 is used to illuminate the microbolometer array. The corresponding detected electrical signal for each bolometer element in the microbolometer array is recorded at the specific scene temperature. This procedure is repeated for various temperatures within the span of the desired temperature detection range. A lookup table for various scene temperatures is generated for each bolometer element. A linear response of detected electrical signal to scene temperature allows for a mathematical calculation (linear regression of data in the lookup table) of arbitrary scene temperatures. A non-linear response of detected electrical signal to scene temperature requires interpolation or extrapolation data from the lookup table.

Bolometer element 300, including substrate 302, optical resonator 310a, and waveguide 310b may be formed using various fabrication methods, such as lithography methods (e.g., photolithography, e-beam lithography, embossing, direct pattern writing, 3D printing), film deposition, chemical vapor deposition, film growth, film etching, wet-etching, plasma etching, and ion etching, by way of non-limiting examples.

Methods in accordance with embodiments of the present invention has several advantages over previous optical detector systems. More particularly, optical detector system 100 in accordance with embodiments of the present invention has more sensitivity to incoming radiation in the IR and terahertz regions of the electromagnetic spectrum. More specifically, lack of metal traces to each of bolometer element 300 of microbolometer array 102 potentially increases the thermal isolation of bolometer element 300. Moreover, optical detector system 100 in accordance with embodiments of the present invention includes a readout mechanism, without the use of electric wires or ROIC, that detects the changes to each pixel in the array and outputs that information to imaging electronics that generates the high-resolution image. More specifically, in one embodiment of the invention, the readout detector could include a commercial CCD or CMOS array optimized for detection of visible or near-IR light. Another advantage is that each optical resonator 310a in the array can be made nearly identical using fabrication techniques, which is more efficient than tuning each optical resonator 310a to a different specific resonant wavelength. Further, a narrowband readout light source 104 can be used in optical detector system 100 in accordance with embodiments of the present invention by tuning each optical resonator 310a to a similar wavelength.

Optical detector system 100 in accordance with one or more embodiments of the present invention can be adapted to a variety of configurations. It is thought that optical detector system 100 in accordance with various embodiments of the present invention and many of its attendant advantages will be understood from the foregoing description and it will be apparent that various changes may be made without departing from the spirit and scope of the invention or sacrificing all of its material advantages, the form hereinbefore described being merely a preferred or exemplary embodiment thereof.

Those familiar with the art will understand that embodiments of the invention may be employed, for various specific purposes, without departing from the essential substance thereof. The description of any one embodiment given above is intended to illustrate an example rather than to limit the invention. This above description is not intended to indicate that any one embodiment is necessarily preferred over any other one for all purposes, or to limit the scope of the invention by describing any such embodiment, which invention scope is intended to be determined by the claims, properly construed, including all subject matter encompassed by the doctrine of equivalents as properly applied to the claims.

What is claimed is:

1. An optical detector system comprising:
    an optical light source for providing a readout light input having a predetermined frequency;
    a plurality of microbolometers positioned in an array, wherein each of the plurality of the microbolometers comprises:
        a substrate comprising a trench positioned along the center of the substrate, wherein the trench has a depth equal to about a thickness of the substrate;
        a membrane layer positioned on the substrate, wherein the membrane layer comprises a membrane and a plurality of membrane isolation legs, wherein the plurality of the membrane isolation legs and the membrane form a first platform suspended in the trench formed by the substrate, wherein the plurality of the membrane isolation legs provide thermal isolation to the membrane;
        an absorber positioned on the membrane to absorb heat from electromagnetic radiation incident on the absorber;
        an optical resonator positioned in thermal connection with the absorber, wherein the optical resonator couples a portion of the readout light input at a resonance frequency;
    a waveguide for receiving the readout light input from the optical light source;
    a plurality of waveguide splitters for splitting the waveguide to a plurality of output waveguides, wherein each of the plurality of the microbolometers is optically coupled to at least one of the plurality of the output waveguides, wherein the at least one of the plurality of the output waveguides coupled to the microbolometer is configured to couple the portion of the readout light input to the optical resonator at the resonance frequency to generate a readout light output, wherein the readout light output having a change in a characteristic from the readout light input based on a change in a characteristic of the optical resonator; and
    a detector for receiving the readout light output from each of the plurality of the output waveguides, wherein the detector is configured to convert the readout light output received from each of the plurality of the output waveguides to an electrical signal corresponding to the change from the readout light input and determine a temperature based on the electrical signal corresponding to the readout light output.

2. The optical detector system of claim 1, further comprising:
    a first dielectric layer positioned on the substrate, wherein the first dielectric layer forms an etch stop below the membrane layer; and
    a second dielectric layer positioned on the membrane layer, wherein the second dielectric layer is positioned below the optical resonator and the at least one of the plurality of the output waveguides, wherein the second dielectric layer separates the membrane layer from the optical resonator and the at least one of the plurality of the output waveguides.

3. The optical detector system of claim 1, wherein the substrate comprises a silicon layer, wherein the first and the second dielectric layers comprises silicon dioxide, and wherein the membrane layer comprises silicon nitride.

4. The optical detector system of claim 1, wherein the plurality of the microbolometers is positioned in a one-dimensional array.

5. The optical detector system of claim 1, wherein the plurality of the microbolometers is positioned in a two-dimensional array.

6. The optical detector system of claim 1, wherein the change in the characteristic of the readout light output comprises a change in frequency.

7. The optical detector system of claim 1, wherein the absorber positioned on the membrane absorbs heat from infrared radiation incident on the absorber.

8. The optical detector system of claim 1, wherein the absorber positioned on the membrane absorbs heat from terahertz radiation incident on the absorber.

9. The optical detector system of claim 1, wherein the change in the characteristic of the optical resonator comprises a change in refractive index of the optical resonator.

10. The optical detector system of claim 1, wherein the optical resonator is configured to change the resonant frequency upon a temperature change.

11. The optical detector system of claim 1, wherein the optical resonator and the waveguide comprises silicon nitride.

12. The optical detector system of claim 1, wherein the optical resonator is selected from a group comprising a ring resonator, a disk resonator, a toroid resonator, a photonic crystal cavity, a whispering gallery mode resonator, a Bragg grating, and a Fabry-Perot interferometer.

13. An optical detector system comprising:
an optical light source for providing a readout light input having a predetermined frequency;
a plurality of microbolometers positioned in an array, wherein each of the plurality of the microbolometers comprises:
a substrate comprising a trench positioned along the center of the substrate, wherein the trench has a depth equal to about a thickness of the substrate;
a first dielectric layer positioned on the substrate to form an etch stop;
a membrane layer positioned on the first dielectric layer, wherein the membrane layer comprises a membrane and a plurality of membrane isolation legs, wherein the plurality of the membrane isolation legs and the membrane form a first platform suspended in the trench formed by the substrate, wherein the plurality of the membrane isolation legs provide thermal isolation to the membrane;
a second dielectric layer positioned on the membrane layer;
an optical resonator positioned on the second dielectric layer, wherein the second dielectric layer separates the optical resonator from the membrane layer, wherein the optical resonator couples a portion of the readout light input at a resonance frequency;
an absorber positioned on the membrane and in thermal connection with the optical resonator, wherein the absorber absorbs heat from electromagnetic radiation incident on the absorber;

a waveguide for receiving the readout light input from the optical light source;
a plurality of waveguide splitters for splitting the waveguide to a plurality of output waveguides, wherein each of the plurality of the microbolometers is optically coupled to at least one of the plurality of the output waveguides, wherein the at least one of the plurality of the output waveguides coupled to the microbolometer is positioned on the second dielectric layer, wherein the second dielectric layer separates the at least one of the plurality of the output waveguides from the membrane layer, wherein the at least one of the plurality of the output waveguides coupled to the microbolometer is configured to couple the portion of the readout light input to the optical resonator at the resonance frequency to generate a readout light output, wherein the readout light output having a change in a characteristic from the readout light input based on a change in a characteristic of the optical resonator; and
a detector for receiving the readout light output from each of the plurality of the output waveguides, wherein the detector is configured to convert the readout light output received from each of the plurality of the output waveguides to an electrical signal corresponding to the change from the readout light input and determine a temperature based on the electrical signal corresponding to the readout light output.

14. The optical detector system of claim 13, wherein the substrate comprises a silicon layer, wherein the first and the second dielectric layers comprises silicon dioxide, wherein the membrane layer comprises silicon nitride, and wherein the optical resonator and the waveguide comprises silicon nitride.

15. The optical detector system of claim 13, wherein the plurality of the microbolometers is positioned in a one-dimensional array.

16. The optical detector system of claim 13, wherein the optical resonator is configured to change the resonant frequency upon a temperature change.

17. The optical detector system of claim 13, wherein the optical resonator is selected from a group comprising a ring resonator, a disk resonator, a toroid resonator, a photonic crystal cavity, a whispering gallery mode resonator, a Bragg grating, and a Fabry-Perot interferometer.

18. An optical detector system comprising:
an optical light source for providing a readout light input having a predetermined frequency;
a plurality of microbolometers positioned in an array, wherein each of the plurality of the microbolometers comprises:
a substrate comprising a trench positioned along the center of the substrate, wherein the trench has a depth equal to about a thickness of the substrate;
a first silicon dioxide layer positioned on the substrate to form an etch stop;
a silicon nitride layer positioned on the first dielectric layer, wherein the silicon nitride layer comprises a membrane and a plurality of membrane isolation legs, wherein the plurality of the membrane isolation legs and the membrane form a first platform suspended in the trench formed by the substrate, wherein the plurality of the membrane isolation legs provide thermal isolation to the membrane;
a second silicon dioxide layer positioned on the silicon nitride layer;
an optical resonator positioned on the second silicon dioxide layer, wherein the second silicon dioxide layer separates the optical resonator from the membrane layer, wherein the optical resonator couples a portion of the readout light input at a resonance frequency, wherein the optical resonator is configured to change the resonant frequency upon a temperature change;

an absorber positioned on the membrane and in thermal connection with the optical resonator, wherein the absorber absorbs heat from electromagnetic radiation incident on the absorber;

a waveguide for receiving the readout light input from the optical light source;

a plurality of waveguide splitters for splitting the waveguide to a plurality of output waveguides, wherein each of the plurality of the microbolometers is optically coupled to at least one of the plurality of the output waveguides, wherein the at least one of the plurality of the output waveguides coupled to the microbolometer is positioned on the second silicon dioxide layer, wherein the second silicon dioxide layer separates the at least one of the plurality of the output waveguides from the membrane layer, wherein the at least one of the plurality of the output waveguides coupled to the microbolometer is configured to couple the portion of the readout light input to the optical resonator at the resonance frequency to generate a readout light output, wherein the readout light output having a change in a characteristic from the readout light input based on a change in the resonant frequency of the optical resonator; and a detector for receiving the readout light output from each of the plurality of the output waveguides, wherein the detector is configured to convert the readout light output received from each of the plurality of the output waveguides to an electrical signal corresponding to the change from the readout light input and determine a temperature based on the electrical signal corresponding to the readout light output.

19. The optical detector system of claim 18, wherein the optical resonator is selected from a group comprising a ring resonator, a disk resonator, a toroid resonator, a photonic crystal cavity, a whispering gallery mode resonator, a Bragg grating, and a Fabry-Perot interferometer.

20. The optical detector system of claim 18, wherein the plurality of the microbolometers is positioned in a one-dimensional array.

* * * * *